（12） United States Patent
Kendall

(10) Patent No.: US 9,829,385 B2
(45) Date of Patent: Nov. 28, 2017

(54) CONTAINER FOR MOLTEN METAL, USE OF THE CONTAINER AND METHOD FOR DETERMINING AN INTERFACE

(71) Applicant: Heraeus Electro-Nite International N.V., Houthalen (BE)

(72) Inventor: Martin Kendall, Zonhoven (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 479 days.

(21) Appl. No.: 14/586,091

(22) Filed: Dec. 30, 2014

(65) Prior Publication Data

US 2015/0177074 A1 Jun. 25, 2015

Related U.S. Application Data

(63) Continuation of application No. 11/174,707, filed on Jul. 5, 2005, now abandoned.

(30) Foreign Application Priority Data

Jul. 5, 2004 (DE) .................. 10 2004 032 561

(51) Int. Cl.
*G01K 1/08* (2006.01)
*G01K 1/10* (2006.01)
(Continued)

(52) U.S. Cl.
CPC ............. *G01K 1/125* (2013.01); *B22D 2/003* (2013.01); *B22D 2/006* (2013.01); *G01K 1/105* (2013.01)

(58) Field of Classification Search
CPC .. G01K 1/08; G01K 1/12; G01K 1/14; G01K 1/16; G01K 1/146; G01J 5/004; G01J 5/048; G01J 5/041
(Continued)

(56) References Cited

U.S. PATENT DOCUMENTS 2,644,851 A * 7/1953 Tapke ..................... G01K 7/06
136/228
2,802,894 A 8/1957 Schneider et al.
(Continued)

FOREIGN PATENT DOCUMENTS

CN 1202207 A 12/1998
DE 1054735 B 4/1959
(Continued)

OTHER PUBLICATIONS

Office Action dated Mar. 17, 2015 in EP Application No. 05 013 308.1.
(Continued)

*Primary Examiner* — Gail Kaplan Verbitsky
(74) *Attorney, Agent, or Firm* — Panitch Schwarze Belisario & Nadel LLP

(57) ABSTRACT

A container for molten metal is provided with a temperature measuring device arranged in an opening of a container wall. The temperature measuring device has a protective sheath, which projects into the container and which is closed at its end arranged in the container. A temperature measuring element is arranged in an opening of the protective sheath. The protective sheath is composed of a mixture of a heat-resistant metal oxide and graphite, and the closed end is spaced at least 50 mm from the container wall.

12 Claims, 5 Drawing Sheets

(51) Int. Cl.
*G01K 1/12* (2006.01)
*G01K 1/14* (2006.01)
*B22D 2/00* (2006.01)

(58) Field of Classification Search
USPC .......................................................... 136/234
See application file for complete search history.

(56) References Cited

U.S. PATENT DOCUMENTS

| | | | | |
|---|---|---|---|---|
| 3,091,119 | A * | 5/1963 | Fischer | C21C 5/30 136/234 |
| 3,116,168 | A | 12/1963 | Gee | |
| 3,364,745 | A | 1/1968 | Fetner | |
| 3,379,578 | A | 4/1968 | McTaggart et al. | |
| 3,610,045 | A | 10/1971 | Shearman | |
| 3,821,030 | A | 6/1974 | Darling | |
| 4,135,538 | A | 1/1979 | Kurita | |
| 4,279,151 | A | 7/1981 | Anderson | |
| 4,342,633 | A | 8/1982 | Cure | |
| 4,377,347 | A * | 3/1983 | Hanmyo | C21C 5/4673 136/234 |
| 4,428,686 | A | 1/1984 | Brax | |
| 4,595,300 | A | 6/1986 | Kaufman | |
| 4,625,787 | A * | 12/1986 | Haveman | B22D 11/181 164/449.1 |
| 4,721,533 | A * | 1/1988 | Phillippi | G01K 1/16 136/234 |
| 4,746,534 | A | 5/1988 | Phillippi et al. | |
| 4,749,416 | A | 6/1988 | Greenspan | |
| 4,749,418 | A * | 6/1988 | Saeki | C23C 22/38 106/14.12 |
| 4,984,904 | A * | 1/1991 | Nakano | G01K 1/08 136/232 |
| 5,064,295 | A * | 11/1991 | Thill | G01K 1/14 374/139 |
| 5,069,553 | A | 12/1991 | Phillippi | |
| 5,071,258 | A * | 12/1991 | Usher | G01K 1/105 136/232 |
| 5,180,228 | A | 1/1993 | Tarumi et al. | |
| 5,181,779 | A | 1/1993 | Shia et al. | |
| 5,209,571 | A | 5/1993 | Kendall | |
| 5,302,027 | A * | 4/1994 | Park | G01J 5/041 374/139 |
| 5,308,044 | A * | 5/1994 | Nakashima | C03B 5/1672 136/234 |
| 5,360,269 | A | 11/1994 | Ogawa et al. | |
| 5,388,908 | A | 2/1995 | Kendall | |
| 5,474,618 | A | 12/1995 | Allaire | |
| 5,596,134 | A | 1/1997 | Phillippi et al. | |
| 5,827,474 | A | 10/1998 | Usher et al. | |
| 6,280,083 | B2 | 8/2001 | Kita et al. | |
| 6,309,442 | B1 | 10/2001 | Usher | |
| 6,367,974 | B1 | 4/2002 | Lin | |
| 6,632,018 | B2 | 10/2003 | Isshiki et al. | |
| 6,679,627 | B1 * | 1/2004 | Allaire | G01K 1/105 374/139 |
| 6,739,750 | B2 | 5/2004 | Okuzono | |
| 6,772,085 | B2 | 8/2004 | Watkins et al. | |
| 6,776,524 | B2 * | 8/2004 | Park | G01K 7/02 374/148 |
| 7,140,765 | B2 | 11/2006 | Memoli et al. | |
| 8,661,891 | B2 * | 3/2014 | Xie | B22D 2/003 73/295 |
| 2003/0154819 | A1 | 8/2003 | Mahapatra et al. | |
| 2004/0047395 | A1 | 3/2004 | Xie et al. | |
| 2004/0174922 | A1 | 9/2004 | Yamashita et al. | |
| 2004/0240518 | A1 | 12/2004 | Memoli et al. | |
| 2005/0157773 | A1 | 7/2005 | Van Der Maat et al. | |
| 2006/0002449 | A1 | 1/2006 | Kendall | |

FOREIGN PATENT DOCUMENTS

| | | |
|---|---|---|
| DE | 7228088 U | 3/1976 |
| DE | 3725615 C3 | 11/2000 |
| EP | 35488 A1 | 9/1981 |
| EP | 0314807 B1 | 1/1993 |
| GB | 781056 A | 8/1957 |
| GB | 1151019 A | 5/1969 |
| JP | 51-036964 | 3/1976 |
| JP | 57118329 U | 7/1982 |
| JP | 60-198423 A | 10/1985 |
| JP | 61009966 A | 1/1986 |
| JP | 61068525 A | 4/1986 |
| JP | 61-246636 A | 11/1986 |
| JP | 01169329 A | 7/1989 |
| JP | 02-069627 A | 3/1990 |
| JP | 2264833 A | 10/1990 |
| JP | 04004096 A | 1/1992 |
| JP | 4066267 A | 3/1992 |
| JP | 06258129 A | 9/1994 |
| JP | 08-320263 A | 12/1996 |
| JP | 2000-035364 A | 2/2000 |
| JP | 2000192124 A | 7/2000 |
| JP | 2000-213997 A | 8/2000 |
| JP | 2002018563 A | 1/2002 |
| JP | 2002356709 A | 12/2002 |
| WO | 9712068 A1 | 4/1997 |
| WO | 0009767 A1 | 2/2000 |
| WO | 03029771 A2 | 4/2003 |

OTHER PUBLICATIONS

Office Action dated Sep. 14, 2010 in Japanese Patent Application No. 2005-189712.
Japanese Office Action dated May 24, 2011 in Japanese Patent Application No. 2008-325957.
Decision of Dismissal of Amendment dated Nov. 8, 2011 in Patent Application Publication No. 2008-325957.
Cui Chunmeng et al., "The temperature measurement technology for non-ferrous metals metallurgy and machining," Issue 3, pp. 38-41 (1996).
Office Action dated Aug. 31, 2006 in U.S. Appl. No. 11/174,707.
Office Action dated May 29, 2007 in U.S. Appl. No. 11/174,707.
Office Action dated Mar. 19, 2008 in U.S. Appl. No. 11/174,707.
Office Action dated Dec. 29, 2008 in U.S. Appl. No. 11/174,707.
Office Action dated Oct. 16, 2009 in U.S. Appl. No. 11/174,707.
Office Action dated Aug. 30, 2010 in U.S. Appl. No. 11/174,707.
Board Decision dated Nov. 3, 2014 in U.S. Appl. No. 11/174,707.
Office Action dated Jul. 4, 2017 in BR Application No. PI0502733-0.

* cited by examiner

CONTAINER FOR MOLTEN METAL, USE OF THE CONTAINER AND METHOD FOR DETERMINING AN INTERFACE

CROSS-REFERENCE TO RELATED APPLICATIONS

This application is a Continuation of U.S. patent application Ser. No. 11/174,707, filed Jul. 5, 2005, which is based on German Patent Application No. 10 2004 032 561.8 filed Jul. 5, 2004, and the disclosures of which are incorporated herein by reference.

BACKGROUND OF THE INVENTION

The invention relates to a container for molten metals with a temperature measuring device arranged in an opening of a container wall, wherein the temperature measuring device has a protective sheath, which projects into the container and which is closed at its end arranged in the container, and a temperature measuring element arranged in an opening of the protective sheath. In addition, the invention relates to the use of the container, as well as to a method for determining an interface between two materials arranged one above the other in a container, particularly between a slag layer and underlying steel melts.

Such containers are known from the prior art. For example, it is known from German Utility Model GM 72 28 088 to arrange a thermocouple in a wall of a steel ladle. The thermocouple is arranged in a steel tube, which is surrounded by a ceramic protective layer. German Patent DE 1 054 735 discloses a smelting crucible for metals, in whose side wall a temperature sensor is inserted. The temperature sensor has a protective tube made of a metal-ceramic material, such as molybdenum and aluminum oxide. The protective tube projects with its tip approximately 25 mm into the side of the smelting space. U.S. Pat. No. 3,610,045 discloses a smelting crucible for molten iron, in whose side wall a thermocouple is arranged. The thermocouple is protected by a conical protective sheath made of aluminum oxide and silicon oxide. A similar container is known from European Patent EP 314 807 B1. Also in this container, a thermocouple is led through the wall into the interior of the container. The thermocouple is protected by an aluminum oxide tube which, in turn, is surrounded by a boron nitride protective sheath in the interior of the container.

From U.S. Pat. No. 6,309,442 B1 a container for molten metals is known, on whose inner side contacts made of zirconium dioxide or thorium dioxide are arranged one above the other, in order to measure the level of the interface between the molten metal and the slag.

BRIEF SUMMARY OF THE INVENTION

The invention is based on the problem of improving a container for molten metals, such that the temperature of the melt located therein can be measured as accurately as possible over a longer time period. The invention is further based on the problem of further improving the known method for determining the interface level.

According to the invention, the problem is solved by a container for molten metal with a temperature measuring device arranged in an opening of a container wall, wherein the temperature measuring device has a protective sheath, which projects into the container and which is closed on its end arranged in the container, and a temperature measuring element arranged in an opening of the protective sheath, characterized in that the protective sheath comprises a mixture of a heat-resistant metal oxide and graphite and that the closed end is spaced at least 50 mm from the container wall.

Therefore, because the container characterized above has a protective sheath made of a heat-resistant metal oxide and graphite, and because the closed end of the protective sheath is spaced at least 50 mm, preferably approximately 75 to 200 mm, from the container wall, the actual temperature of the molten metal can be measured without cooling effects, possibly coming from the crucible wall, influencing the measurement values. At the same time, the protective sheath is sufficiently resistant to aggressive molten metal, particularly molten steel, and thus is suitable for long-term use.

The temperature measuring element with the protective sheath can preferably be arranged in the base (floor) of the container, so that it can also be used for measurements with low filling levels. The protective sheath preferably consists essentially of aluminum oxide and graphite, wherein aluminum oxide can comprise particularly a portion of approximately 20 to approximately 80 wt. % and graphite a portion of approximately 5 to approximately 60 wt. %. The protective sheath can also contain carbon in a different form than graphite and/or other refractory oxides.

Within the protective sheath, it is beneficial if the temperature measuring element, preferably a thermocouple, is surrounded by a protective tube, which is preferably formed of aluminum oxide. It is beneficial if the outer diameter of the protective tube is approximately 0.1 to 1 mm smaller than the inner diameter of the opening of the protective sheath. The protective sheath can have, at least in one part of its length, an outer conical form with a diameter becoming smaller towards the interior of the container, in order to enable secure mounting in the container wall and sufficient stability of the protective sheath.

Furthermore, it can be beneficial if a sensor projecting into the interior of the container is arranged on the protective sheath for determining a change in material or a change of material properties, particularly an electrochemical, electromagnetic, or optical sensor or a sensor for detecting an electrical voltage and/or an electrical current and/or an electrical resistance. In this manner, interface measurements become possible between the molten metal, particularly the molten steel, and the above-lying slag.

As soon as the sensor touches the interface, the signal picked up by the sensor changes and thus indicates that the interface has been reached. Furthermore, it can be advantageous if a bushing made of refractory material, preferably made of mullite, is arranged in the opening of the container wall between the container wall and the protective sheath, wherein the bushing can have a conical shape with a diameter becoming smaller towards the interior of the container.

According to the invention, the container can be used as a foundry ladle, particularly for molten steel. The molten metal is always moving in a foundry ladle, a so-called tundish, so that a particularly high stability is required for the measuring device projecting relatively far into the container. The foundry ladle is typically pre-heated, so that the measuring device is also pre-heated. This leads to very short reaction times, so that the temperature measuring device very quickly reaches its equilibrium temperature with the melt, and the measurement can be performed very quickly.

The problem is solved for the method characterized at the outset in that a sensor for determining a change in material or a change of material properties, particularly an electrochemical, electromagnetic, or optical sensor or a sensor for detecting an electrical voltage and/or an electrical current and/or an electrical resistance is arranged within the lower material contained in the container. The measurement signal of the electrochemical sensor is measured during the pouring out or outflow of the material from the container, and a change in the signal is established when the sensor contacts the interface between the materials. Preferably, the signal change is associated with the distance of the interface from the floor of the container. In addition, it can be beneficial if the pouring or outflow process is ended when the signal changes. For this purpose, the measurement signal is simultaneously used to send a signal to the device controlling the pouring or outflow process, on the basis of which the pouring or outflow process is terminated.

Despite the relatively large length by which the protective sheath projects into the melt, the device has sufficient stability, so that a measurement of the temperature of the molten metal and a measurement of the position of the interface between the molten metal and the above-lying slag is possible.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
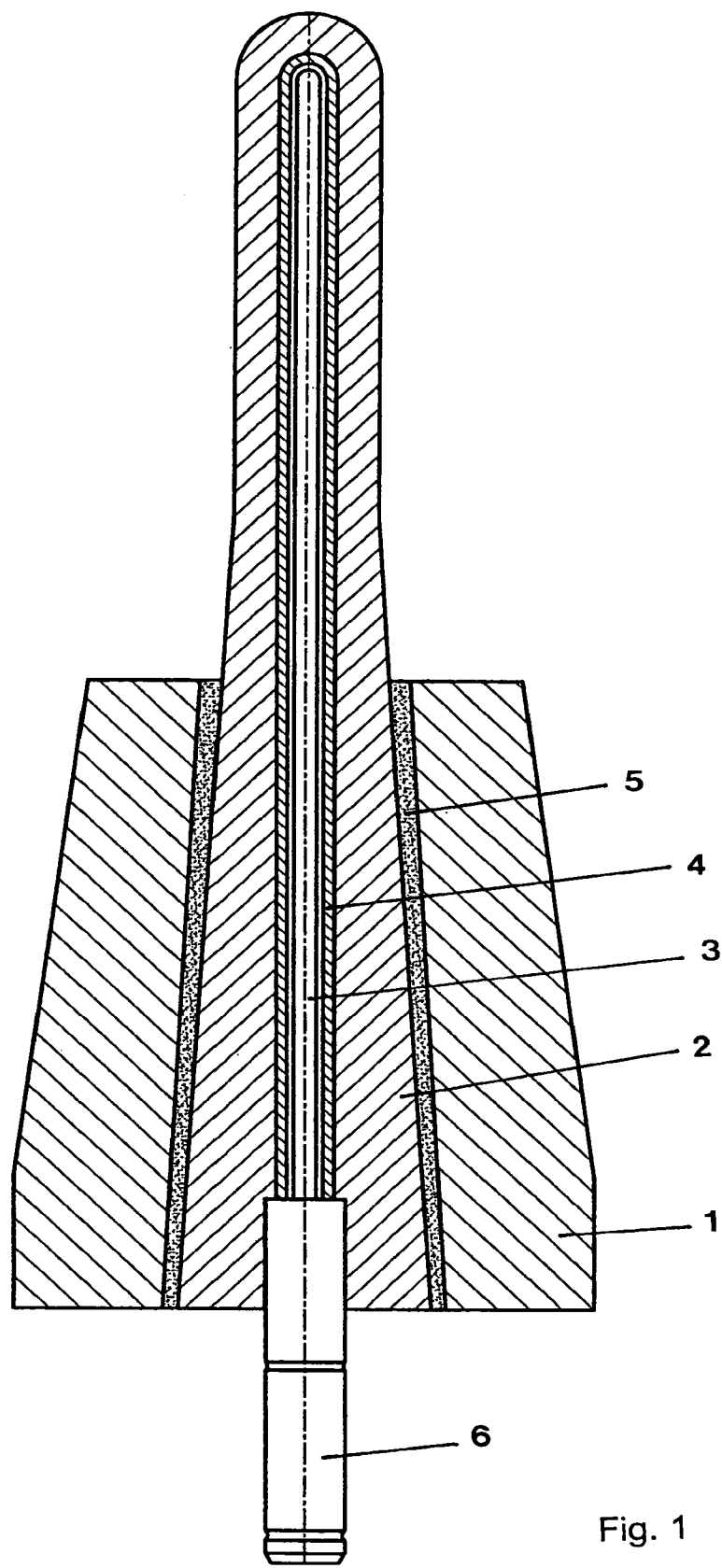
FIG. 1 is a view of a longitudinal cross section through the temperature measuring device, according to an embodiment of the invention.
Figure 3:
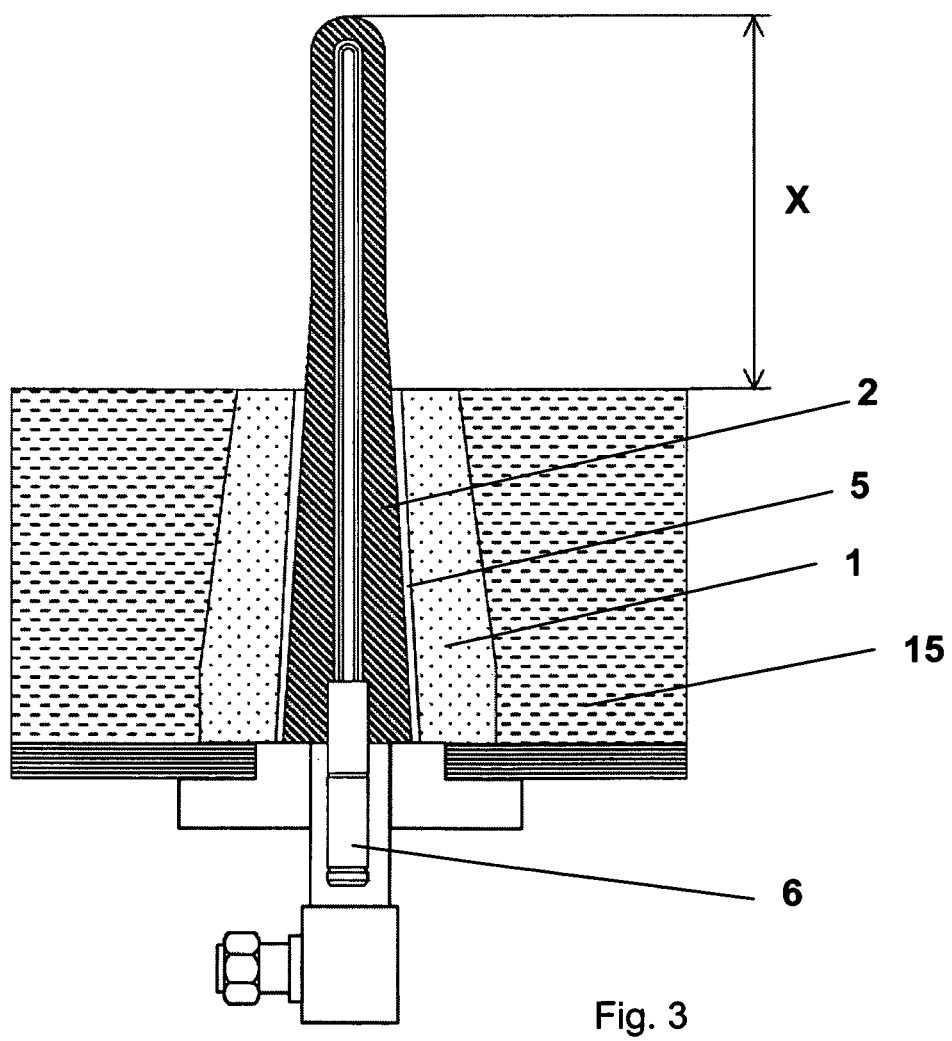
FIG. 3 is a view of a longitudinal cross section through the temperature measuring device, according to an embodiment of the invention, fixed in the container wall.
Figure 4:
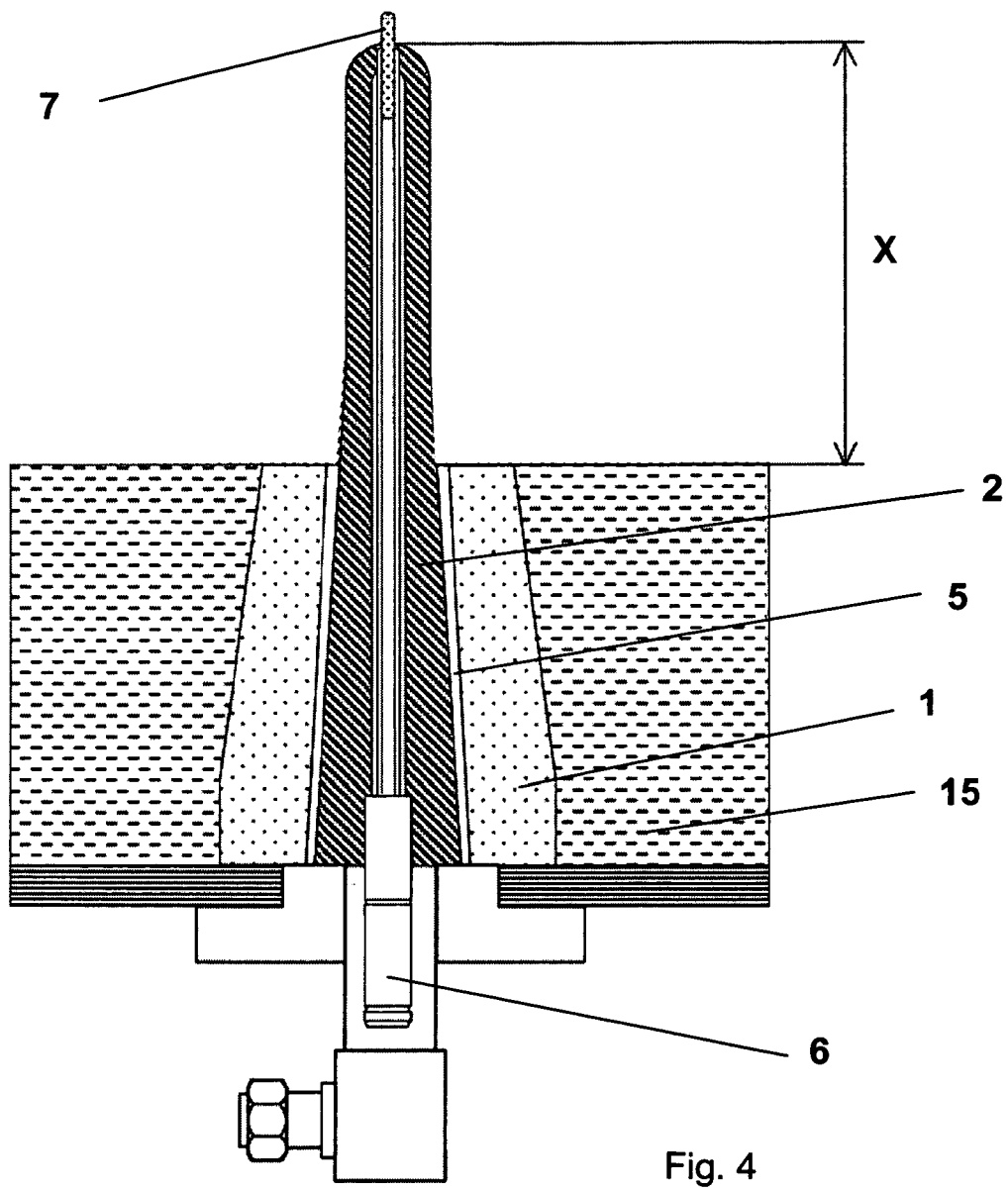
FIG. 4 is a view of a longitudinal cross section through the temperature measuring device with electrochemical sensor, according to an embodiment of the invention, fixed in the container wall.
Figure 5:
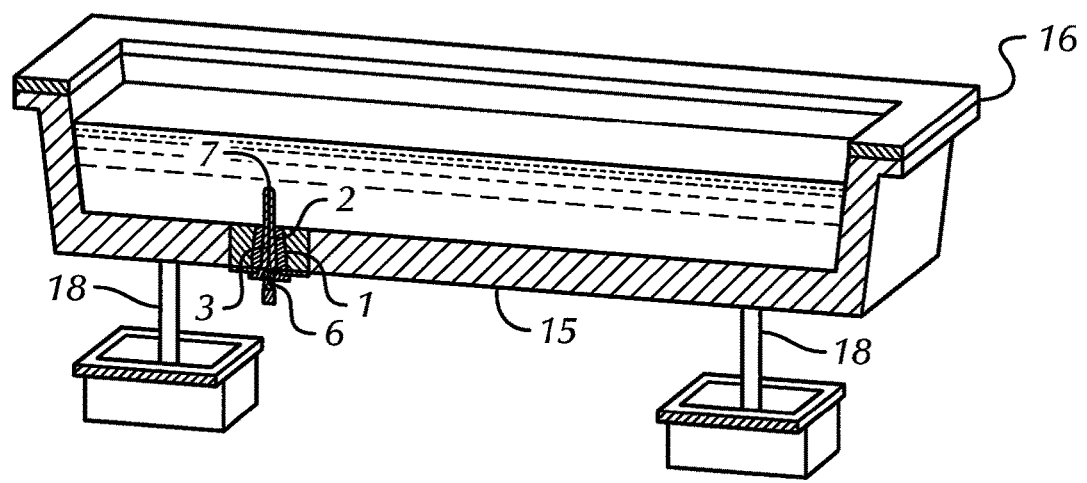
FIG. 5 is a longitudinal cross sectional view of a tundish with a temperature measuring device fixed therein, according to an embodiment of the invention.

The measuring device according to one embodiment of the invention has a bushing 1 made of mullite. As shown in FIGS. 3 and 4, this is fixed in a wall 15 of the container, for example, in the floor of a foundry ladle for molten steel, a so-called tundish 16, as shown in FIG. 5. Such foundry ladles are known in expert circles, for example from the already mentioned U.S. Pat. No. 6,309,442 B1 (cf. FIG. 1, numeral 16). The protective sheath 2 is arranged in the bushing 1. The protective sheath 2 consists essentially of a mixture of aluminum oxide and graphite. The protective sheath 2 has a conical profile at least in the part arranged in the bushing 1. This enables easier removal from the bushing 1 for exchanging the protective sheath 2 with the temperature measuring element 3. The temperature measuring element 3 is surrounded by a closed aluminum oxide tube 4 within the protective sheath 2.

The protective sheath 2 is fixed into the bushing 1 by refractory cement 5. The tip of the protective sheath 2 projects a distance X from the container wall, for example, approximately 120 mm into the foundry ladle, so that the measurement performed at the tip of the temperature measuring element 3 remains uninfluenced by wall effects of the foundry ladle. The end of the temperature measuring element 3 facing away from the interior of the foundry ladle has a so-called connector 6, which serves as the mechanical and electrical contact with the measuring element 3. The entire arrangement made of the mullite of the bushing 1 and the protective sheath 2 fixed by the cement 5 comprises a dense, powder-free material, so that there is no leakage in case a break of one part of the arrangement occurs, and molten metal cannot escape from the foundry ladle.

Figure 2:
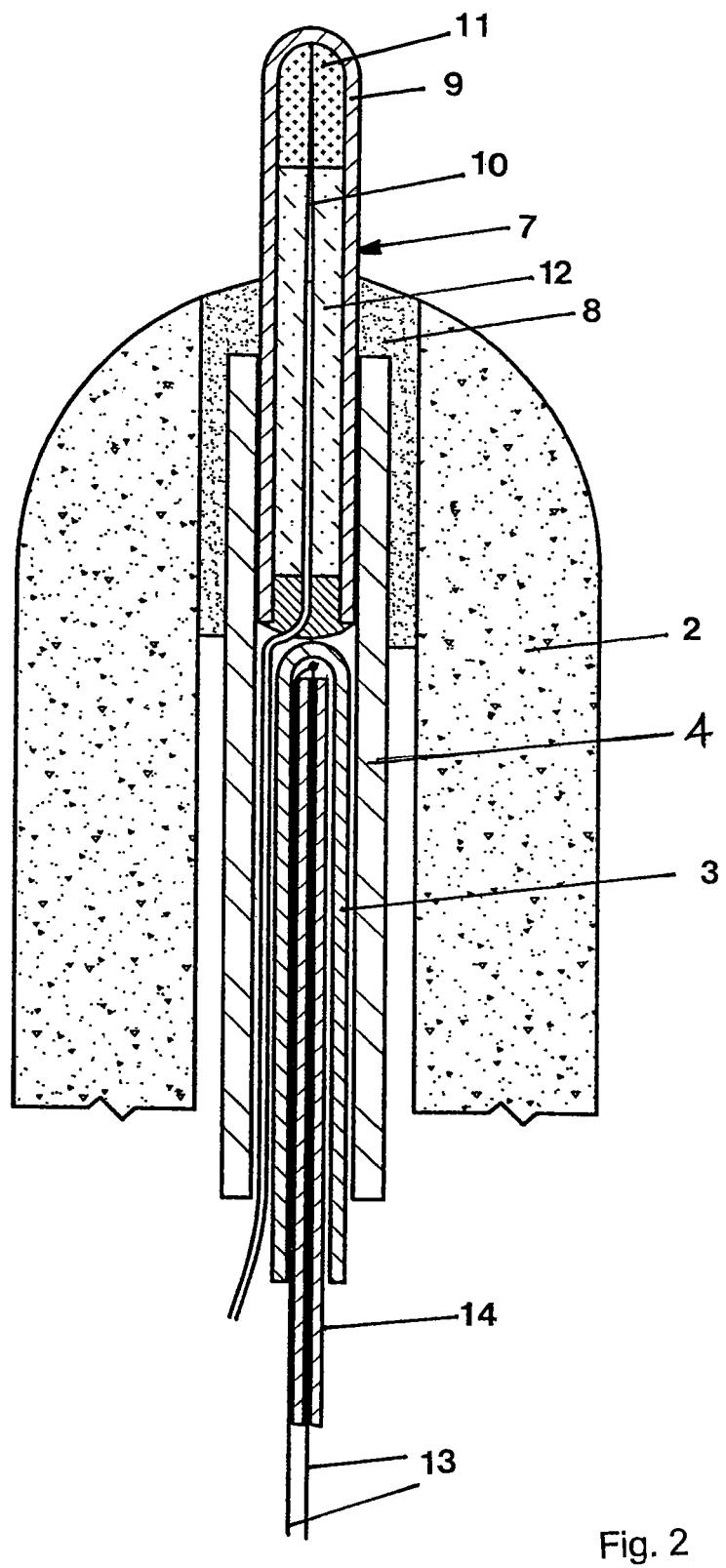
FIG. 2 is a partial longitudinal view of the closed end of the temperature measuring device with electrochemical sensor, according to an embodiment of the invention.

FIG. 2 shows the tip of the protective sheath 2, which projects into the foundry ladle, with the temperature measuring element 3 and an electrochemical sensor 7. The electrochemical sensor 7 projects out of the protective sheath 2 and is fixed with refractory cement 8. The aluminum oxide tube 4 is also fixed in the refractory cement 8. The electrochemical sensor is a typical electrochemical sensor having a zirconium dioxide tube 9 as solid electrolyte material, in which the reference electrode 10 is arranged in a reference material 11 and a filling material 12. Such electrochemical sensors are known in principle, for example from U.S. Pat. No. 4,342,633.

The temperature measuring element 3 is formed from a thermocouple, wherein the outer sheath comprises aluminum oxide, and one of the two thermal wires 13 extends into an aluminum oxide tube 14 that is open on both sides. All of the electrical lines lead through the aluminum oxide tube 4 into the connector 6 (not shown in FIG. 2 for reasons of clarity, but shown in FIG. 1) and can be further connected there to a measuring device.

The voltage generated by the electrochemical sensor 7 essentially depends on the measurement environment. Therefore, a change in voltage occurs immediately as soon as this environment changes. This is the case, for example, when the liquid level of the molten steel located in the foundry ladle falls and the electrochemical sensor 7 comes into contact with the slag layer arranged above the melt. Therefore, an exact determination of the height of this interface between the molten steel and slag above the floor of the foundry ladle is possible. As soon as the electrochemical sensor 7 detects the interface, for example by another signal, the outflow of the molten steel from the foundry ladle can be terminated by closing the outlet 18, shown in FIG. 5.

Fundamentally, it is also possible to arrange several electrochemical sensors 7 over the periphery of the protective sheath 2 spaced in the longitudinal direction, so that the change of the bath level of the molten metal can also be established. Instead of an electrochemical sensor, other sensors can also be used for establishing the change of the material properties in the interface region of the molten steel and slag, particularly electrochemical, electromagnetic, or optical sensors or sensors for detecting an electrical voltage and/or an electrical current and/or an electrical resistance.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A tundish for molten metal comprising:
   an outlet for outflow of the molten metal from the tundish, the outlet being located in a bottom portion of the tundish;
   a tapered bushing fixed in a wall of the tundish, the tapered bushing being made of refractory material and having an inner sidewall and an outer sidewall, each of the inner sidewall and outer sidewall having a conical shape and a diameter which becomes smaller toward an interior of the tundish; and
   a temperature measuring device arranged in the tapered bushing, the temperature measuring device comprising:
      a monolithic protective sheath projecting into the tundish interior and having a closed end arranged in the tundish interior, the protective sheath being tapered along at least part of its length such that a diameter of the protective sheath becomes smaller toward the tundish interior, the protective sheath consisting essentially of a mixture of a heat-resistant refractory metal oxide and graphite and a length of the protective sheath extending through substantially an entire thickness of the tundish wall to the closed end of the protective sheath, the closed end of the protective sheath projecting into the tundish interior at least 50 mm from the tundish wall,
      an opening extending inside the protective sheath from an end opposite the closed end,
      a temperature measuring element arranged in the opening of the protective sheath in a close fitting relationship, the temperature measuring element being substantially inseparable from the protective sheath, an end of the temperature measuring element facing away from the tundish interior having a connector, and
      a protective tube is arranged in the protective sheath and surrounding the temperature measuring element, an outer diameter of the protective tube being smaller than a diameter of the opening of the protective sheath, the protective tube being spaced apart from the protective sheath at a distance of 0.1 to 1.0 mm,
   wherein the tapered bushing is fixed in the tundish wall between the tundish wall and the protective sheath and wherein the protective sheath is fixed into the tapered bushing by a dense, powder-free refractory cement.

2. The tundish according to claim 1, wherein the closed end of the protective sheath projects into the tundish interior approximately 75 to 200 mm from the tundish wall.

3. The tundish according to claim 1, wherein the temperature measuring device and the tapered bushing are fixed in a part of the tundish wall forming a floor of the tundish.

4. The tundish according to claim 1, wherein the heat resistant refractory metal oxide is aluminum oxide.

5. The tundish according to claim 1, wherein the protective sheath consists essentially of aluminum oxide with a portion of approximately 20 to approximately 80 wt. % and graphite with a portion of approximately 5 to approximately 60 wt. %.

6. The tundish according to claim 1, wherein the protective tube comprises aluminum oxide.

7. The tundish according to claim 1, wherein the temperature measuring element is a thermocouple.

8. The tundish according to claim 1, further comprising a sensor projecting into the tundish interior for determining a change in material, wherein the sensor is arranged on the protective sheath.

9. The tundish according to claim 8, wherein the sensor is at least one selected from the group consisting of an electrochemical sensor, an electromagnetic sensor, an optical sensor, and a sensor for detecting at least one of an electrical voltage, an electrical current and an electrical resistance.

10. The tundish according to claim 1, wherein the tapered bushing comprises mullite.

11. The tundish according to claim 1, wherein the tundish is for casting molten steel.

12. The tundish according to claim 1, wherein the temperature measuring device and the tapered bushing are fixed in the tundish wall proximate to the outlet.

* * * * *